(12) United States Patent
Bray

(10) Patent No.: US 8,161,410 B2
(45) Date of Patent: Apr. 17, 2012

(54) COMPUTER-IMPLEMENTED DISPLAY OF ORDERED ITEMS

(75) Inventor: Cédric Bray, Vincennes (FR)

(73) Assignee: Apple Inc., Cupertino, CA (US)

( * ) Notice: Subject to any disclaimer, the term of this patent is extended or adjusted under 35 U.S.C. 154(b) by 493 days.

(21) Appl. No.: 11/540,046

(22) Filed: Sep. 29, 2006

(65) Prior Publication Data

US 2008/0126934 A1 May 29, 2008

(51) Int. Cl.
*G06F 3/048* (2006.01)

(52) U.S. Cl. ........ 715/848; 715/835; 715/836; 715/853; 715/854

(58) Field of Classification Search .................... 715/848
See application file for complete search history.

(56) References Cited

U.S. PATENT DOCUMENTS

| | | | |
|---|---|---|---|
| 6,281,898 B1 * | 8/2001 | Nikolovska et al. | 715/848 |
| 7,003,737 B2 * | 2/2006 | Chiu et al. | 715/848 |
| 7,171,628 B1 * | 1/2007 | Perttunen | 715/853 |
| 7,392,235 B2 * | 6/2008 | Armangau et al. | 707/1 |
| 7,437,005 B2 * | 10/2008 | Drucker et al. | 382/224 |
| 7,448,001 B2 * | 11/2008 | Miyazaki et al. | 715/853 |
| 7,562,312 B2 * | 7/2009 | Rochford et al. | 715/848 |
| 2005/0091596 A1 * | 4/2005 | Anthony et al. | 715/712 |
| 2005/0144190 A1 * | 6/2005 | Wada | 707/102 |
| 2006/0212833 A1 * | 9/2006 | Gallagher et al. | 715/848 |
| 2006/0271884 A1 * | 11/2006 | Hurst | 715/854 |

* cited by examiner

*Primary Examiner* — Alvin Tan

(74) *Attorney, Agent, or Firm* — Blakely, Sokoloff, Taylor & Zafman LLP

(57) ABSTRACT

A method, in one embodiment, of displaying items arranged in a hierarchy, the hierarchy having predetermined levels and divisions. The method comprising: displaying divisions of a first level of the hierarchy along a first direction; and displaying the items on a plane in perspective view, each item arranged at a position corresponding to the division with which it is associated in a respective second direction at an angle to the first direction. It is preferred that each of the items has associated with it a value, such as a time value, that can be represented on a scale. The divisions of the first level of the hierarchy are first units of the scale, such as years, and the items are arranged at positions corresponding to their value with respect to the first units.

21 Claims, 12 Drawing Sheets

Fig. 1. (Prior Art)

COMPUTER-IMPLEMENTED DISPLAY OF ORDERED ITEMS

FIELD OF THE INVENTION

The present invention relates to a computer-implemented method of, and an apparatus for, displaying items ordered in a hierarchy, such as a list of items.

BACKGROUND ART

The display of ordered items, whether ordered in a list or another hierarchy, by computers is well known. For example, calendar applications running on Macs and PCs are common place. Typically, events in the calendar can be displayed in terms of a simple list in the order in which they occur or in a diary format. Commonly, the user is able to select the display of events at different hierarchical levels. For example, they may select a format from among, for example, a single day format showing hours of a single selected day; a week format showing days in the selected week; a month format showing days or weeks in the month; and a year format showing days, weeks or months in the year. An example of a month format showing days in the selected month is shown in FIG. 1.

The user can click on an arrow button to move through time and to select different levels of a hierarchy in time (days/weeks/months/years) in the selected display format, and the events for the selected time are displayed.

Similarly, it is well-known to order files in a hierarchy of folders. For example, a top-level folder may contain a plurality of files, as well as a plurality of sub-folders—that is, folders at a second level of the hierarchy. These second level folders may each contain a plurality of files, as well as a plurality of sub-sub-folders—that is, folders at a third level of the hierarchy. The hierarchy may contain a large number of different levels.

In addition, it is known to display image files in clusters, the files being arranged in clusters calculated by an algorithm that uses the time when the images were created. The images in each cluster a shown in a row or column, the rows or columns for the respective clusters being arranged on an imaginary three-dimensional (3D) plane.

However, there exist problems with these known applications. In particular, navigation through calendars of events or hierarchies of folders is cumbersome and lacking in aesthetic quality. Moreover, all files located in a hierarchy must presently be accessed by "drilling" down through the hierarchy until the appropriate file is found. However, if the name of the file and its location in the hierarchy is not known, locating a desired file can be time-consuming. Search applications for locating files by properties of the file—for example, words contained in a document file—are known. However, they can be time consuming and difficult to operate, especially when the hierarchy is complex, there are many files in the hierarchy, and the size of individual files in the hierarchy is large.

SUMMARY OF THE INVENTION

According to a first aspect of the present invention, there is provided a method of displaying items arranged in a hierarchy, the hierarchy having predetermined levels and divisions, the method comprising: displaying divisions of a first level of the hierarchy along a first direction; and displaying the items on a plane in perspective view, each item arranged at a position corresponding to the division with which it is associated in a respective second direction at an angle to the first direction. It is preferred that each of the items has associated with it a value, such as a time value, that can be represented on a scale the divisions of the first level of the hierarchy are first units of the scale, such as years, and the items are arranged at positions corresponding to their value with respect to the first units.

In a still preferred aspect, the respective second directions represent a second level of the scale having second units, such as months, that are smaller than the first units, and each item is arranged at a position in its respective second direction corresponding to its value with respect to the second units.

Upon receipt of a user command, divisions of a second level of the hierarchy can be displayed along the first direction and the items can be displayed on the plane, each item arranged at a position corresponding to the division of the second level with which it is associated in a respective second direction at an angle to the first direction. In addition, an animation effect may be provided for the movement of the items from display with the first level of the hierarchy represented along the first direction to display with the second level of the hierarchy represented along the first direction.

In this arrangement, the respective second directions may represent a third level of the scale having third units, such as days, that are smaller than the second units, and each item may be arranged at a position in its respective second direction corresponding to its value. Effectively then, the present invention provides a way for a user to zoom in (and out) of the displayed hierarchy.

Alternatively, the hierarchy may be a hierarchy of folders, for example with each division representing a different folder, or a different hierarchy.

In other aspects, the present invention provides a graphical user interface system for a computer, a computer system, a computer program and a computer-readable recording medium having a computer program recorded on it.

BRIEF DESCRIPTION OF THE DRAWINGS

The present invention will now be described by way of example only with reference to the accompanying drawings, in which:

FIG. 1 is a prior art display of events in a calendar in a month format;

DETAILED DESCRIPTION

Figure 2:
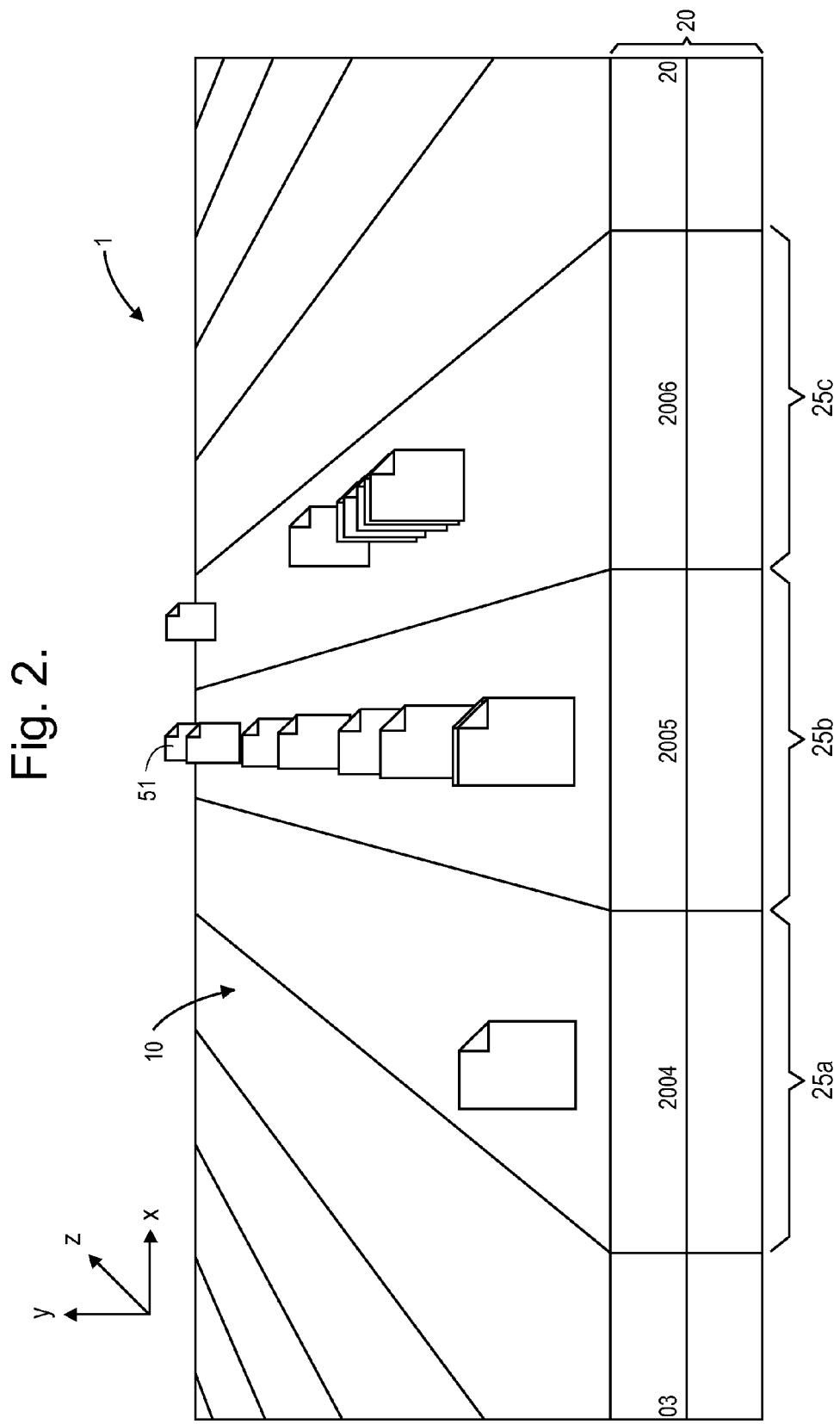
FIG. 2 is a display of a plurality of items in a hierarchy according to the present invention.

A preferred embodiment of the present invention is now described with reference to FIG. 2. In the display 1 shown in FIG. 2 a ground plane 10 having x- and z-directions lying in it is shown in perspective view. A front pane 20 is shown at the front of the ground plane 10. The front pane is divided in the x-direction into predetermined units of time, in this case years. Thus, the front pane shows the years 2004, 2005 and 2006 among others in the x-direction. Corresponding columns 25a, 25b and 25c among others extend backwards along in the z-direction along the ground plane from each of the years shown. A plurality of files is shown in each of the three columns. The files each have a time associated with them, for example the time at which they were created or the time at which they were last accessed or last updated. The user is able to select which of these times should be used to position the items on the ground plane.

Each file is displayed on the ground plane at a position corresponding to its associated time. Thus, if the selected time is the time that the files were created, files created in 2004 are displayed in the 2004 column, files created in 2005 are shown in the 2005 column and so on. Moreover, the position of the files in the columns is dependent on the time that they were created. In the display in FIG. 2 files created earlier in the respective year are shown towards the back of the respective column and files created later in the respective year are shown toward the front of the respective column. Thus, the file marked 51 in FIG. 2 was the first of the displayed files to be created in 2005, whereas the file marked 52 was created towards the end of 2005.

Consequently, it can be seen from the display in FIG. 2 that it is easy to view files across a large time range.

The source of the files (or other items) for display in the present invention is not limited. For example, the source of files could be document files available to the user, or they could be e-mails received by the user. The source of files may be an ordered file hierarchy such as a folder hierarchy as discussed above. All the files in the folder hierarchy can be displayed in the new date hierarchy, without reference to and irrespective of the original folder hierarchy. Accordingly, so long as the user knows the approximate date the file was created, he can easily locate it, without reference to or knowledge of its particular location in the folder hierarchy.

Figure 1:
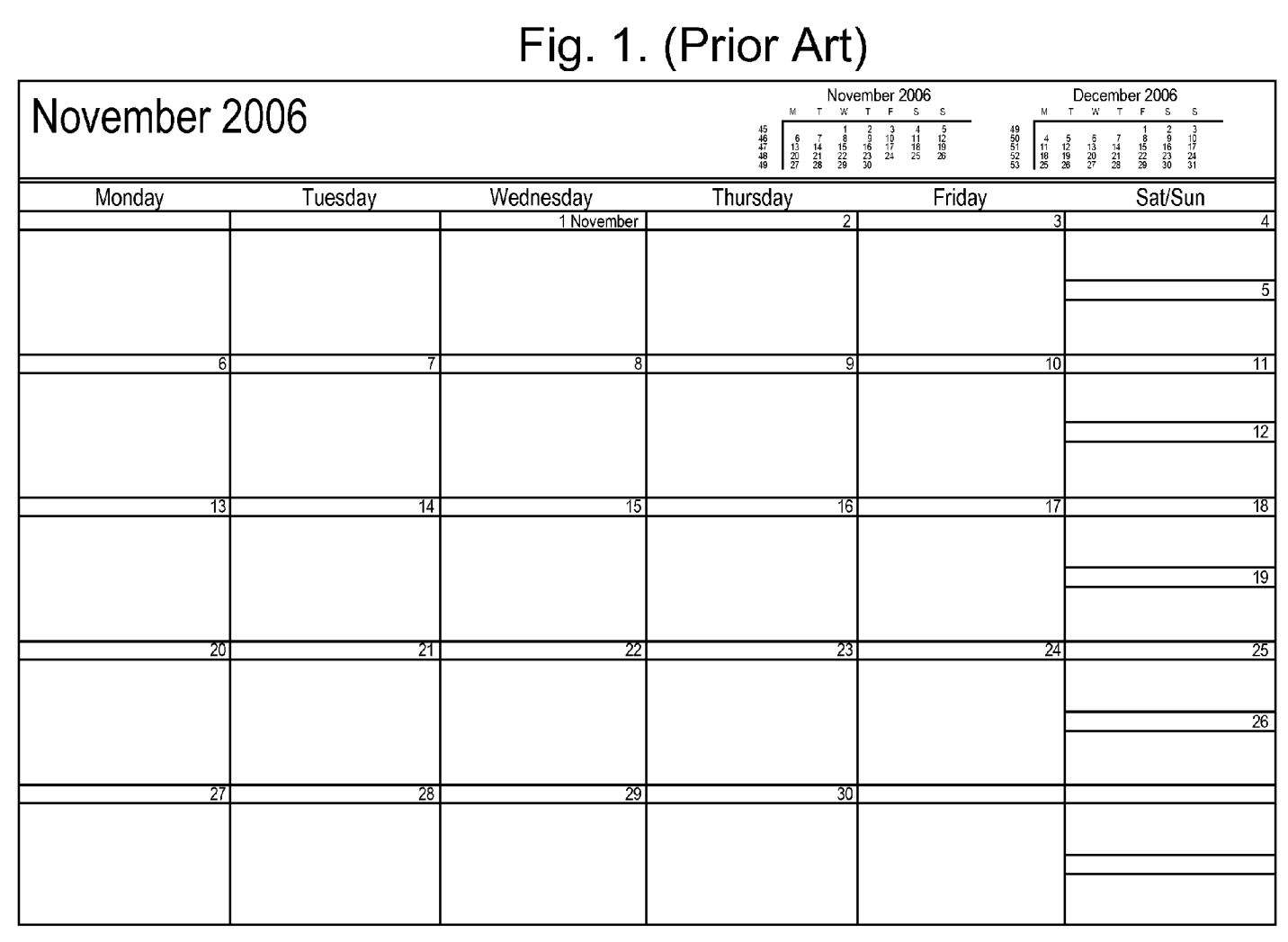

In the display shown in FIG. 1, each file is shown by a simple page. However, the display is not limited to this. Rather, each file may have an icon associated with it, which is displayed on the front of the page. Moreover, the pages may have different colours to represent different file types or levels of importance, for example. Different shapes other than pages may of course be used to display files.

In the event that a large number of files were created at around the same time, a large number of pages need to be displayed very close together, particularly when a large unit of time, such as a year, is used to divide the front pane. This can become different to represent and unsightly. Accordingly, in this event several files may be grouped together in a single block.

Preferably, the depth of the depth of the block depends on the position of the first item (at the front side) in the block and the position of the last item (at the back side) in the block. Thus, the block shows a range in time delimited by the position of these two documents, the block being formed because the density of items between the first item and the last item is greater than a predetermined value.

Preferably, the user may set the density threshold at which items are aggregated into a single block. Thus, the user may decide how many items may be displayed in a unit of time (say, a day) before they are aggregated into a single block. A slider control may be provided in the user interface to allow the user to change the density threshold in real time.

As an alternative, the depth of a block may be used to indicate another value associated with the file, such as the size of the file. As another alternative, the height of the file in the y-direction can be adjusted to indicate the other value associated with the file. In a further alternative, the z- and y-directions can be used to indicate two different values of the file.

The user may move along the x-direction (left and right in FIG. 1), for example by appropriate manipulation of a mouse or use of a keyboard. In this way, earlier and later years can be seen.

In addition, the user may "zoom" in and out of the display, for example by using a scroll wheel on a mouse or positioning a pointer over the appropriate year and clicking on a mouse button. In the display shown in FIG. 3, the user has zoomed in on the year 2005 and two timescales (years and months) are now shown by the front pane 20. Accordingly, the principal units of time shown in the x-direction are now smaller—that is, months—and the files have been rearranged in columns 30a-l corresponding to the months of 2005. Consequently, file 51 is now shown halfway along column 30a, indicating that it was created approximately in mid-January 2005. By contrast, file 52 is shown towards the back of column 30i, indicating that it was created in early September 2005. It is worth noting that in FIG. 3 file 52 is located further towards the back in the z-direction than file 51, whereas the opposite is true in FIG. 2. This is a function of spacing the files in the z-direction as a function of the time at which they were created. Of course, it would be possible simply to use equidistant spacing for the files in each column, with the files simply placed in the order in which they are created.

A user can zoom in or out to any desired scale. Thus, a user could zoom in so that weeks, days, hours etc are shown along the front pane, with the files positioned based on the next sub-unit in the z-direction. In each case, the items would move from the column they are in to the newly appropriate column.

In a preferred embodiment, movement of the files from one column to another as the user zooms in and out is animated. This is illustrated in FIGS. 4 to 6.

Figure 4:
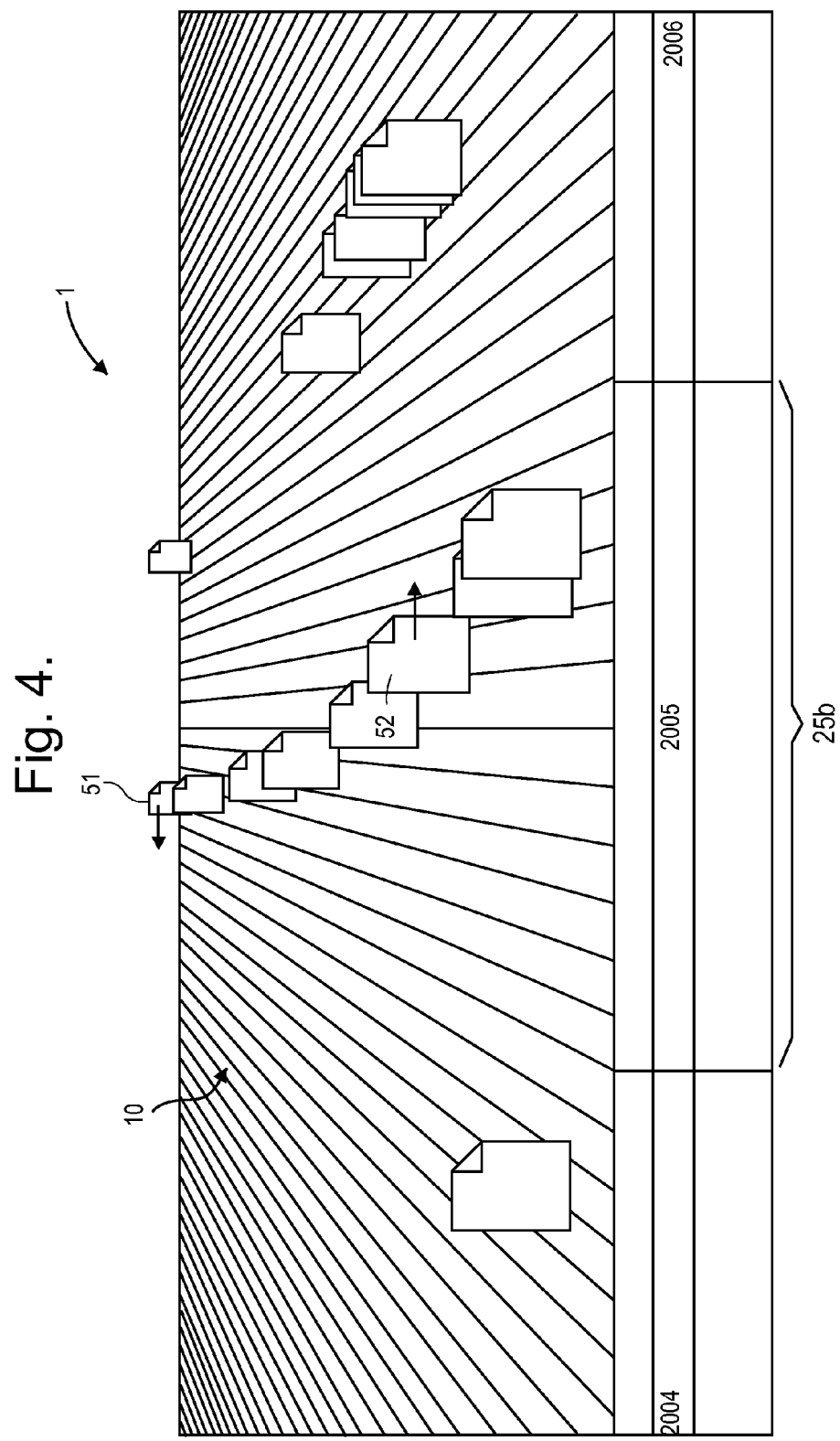
FIGS. 4 to 6 represent how the movement of the sub-set of items is animated between the displays of FIGS. 2 and 3 respectively.

In FIG. 4, the user has clicked on the 2005 division in the front pane of FIG. 2. Accordingly, the division 25b for 2005 has become wider and gradations for sub-divisions 30a-l are shown in the 2005 column for the months. As shown in the example, it is preferred that the gradations are also shown in the other columns, although they need not be. At the same time, the various files have started to move in the x-direction. Thus, since it was created in January 2005, file 51 has started to move leftwards and, since it was created in September, file 52 has moved rightwards.

Figure 5:
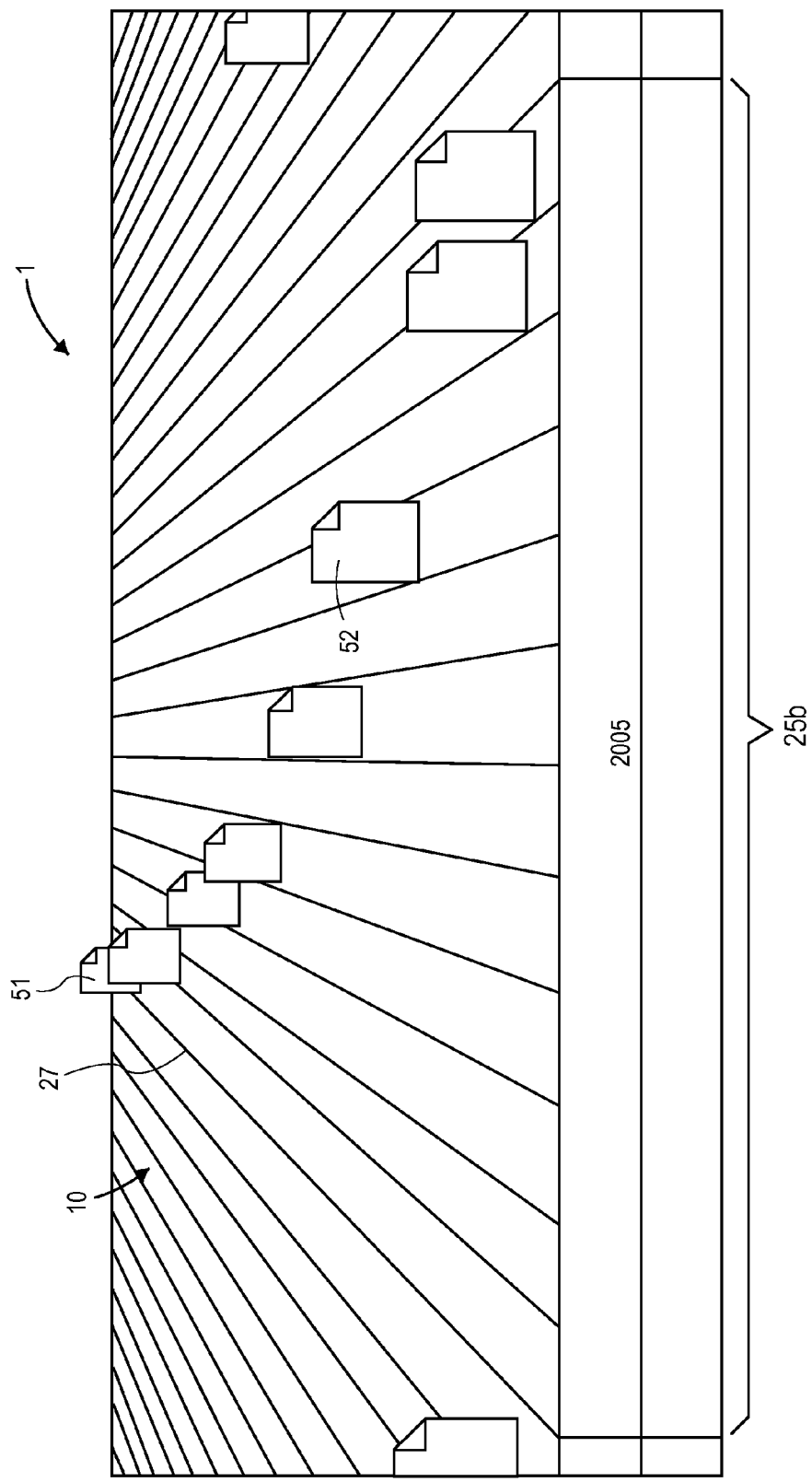

FIG. 5 shows the animation continuing. Thus, the sub-divisions for the month have grown wider in the x-direction and files 51 and 52 have moved towards the left and right respectively in the x-direction.

Figure 6:
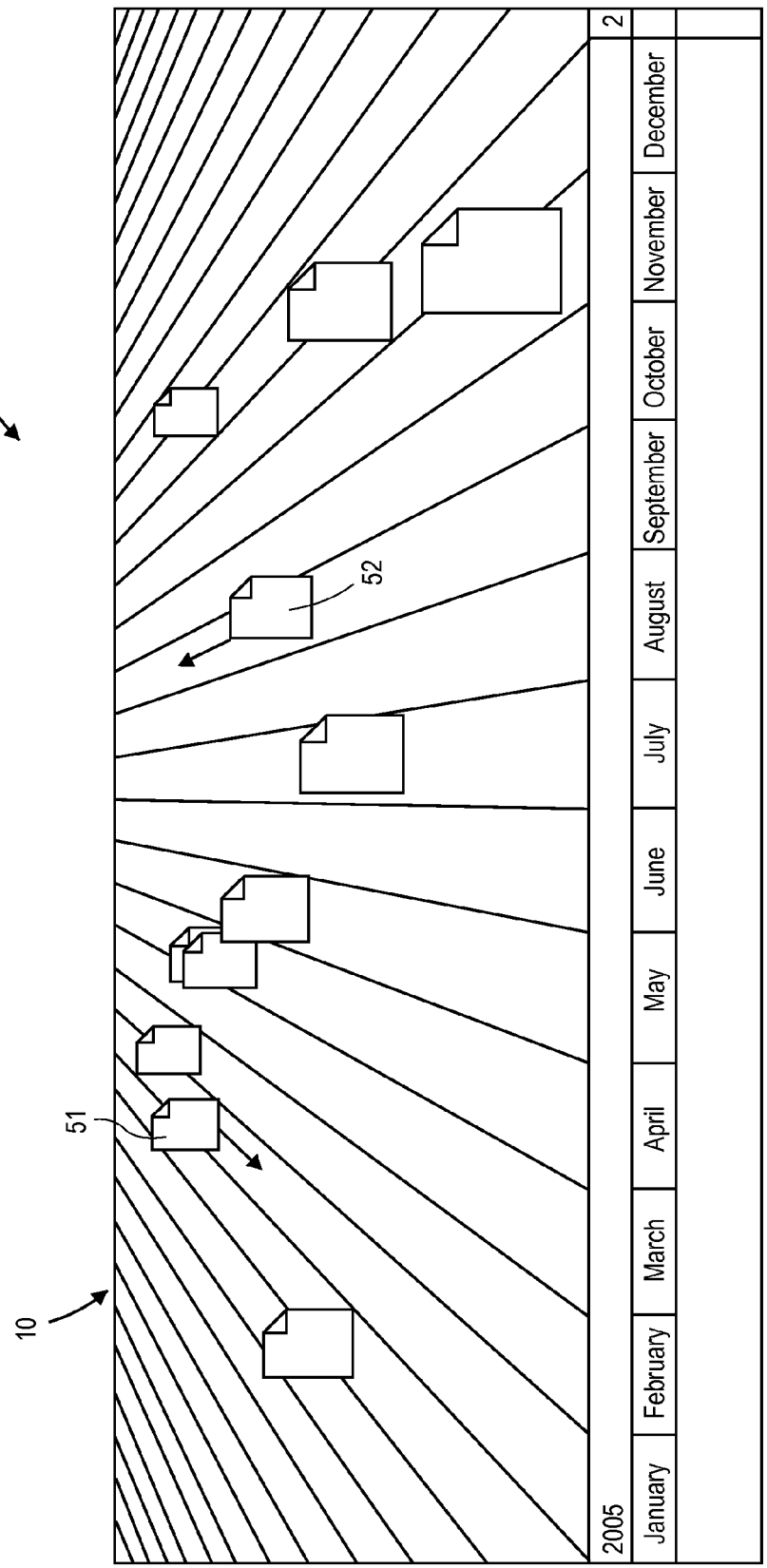

In FIG. 6, the sub-divisions 30a-l have reached their maximum widths and are labelled with the months. Moreover, files 51 and 52 have travelled to the appropriate column 30a, 30g respectively and are now moving in the z-direction. Since file 51 was created mid-month, it moves forwards towards the front pane 20 in the z-direction and since file 52 was created at the beginning of the month and moves backwards away from the front pane 20 in the z-direction.

Figure 3:
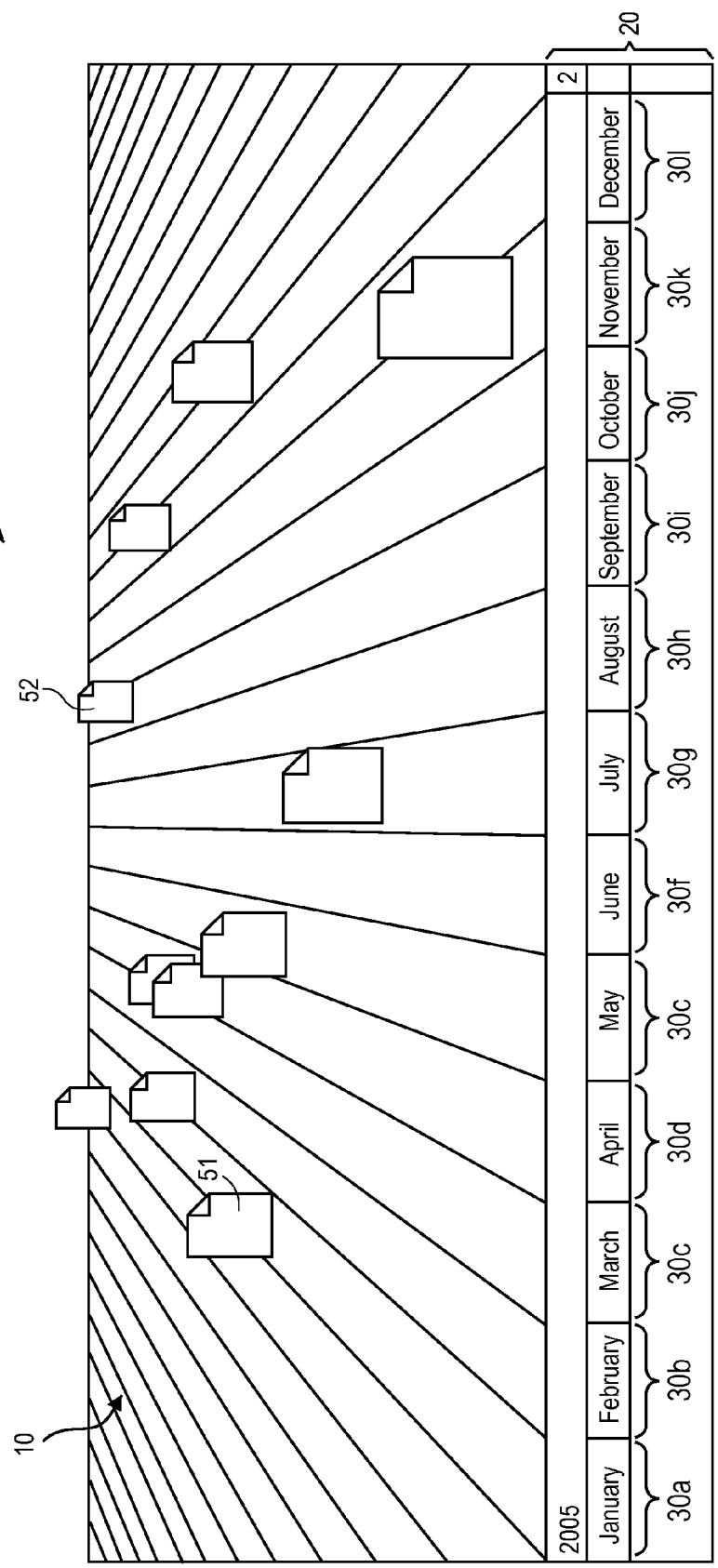
FIG. 3 is a display of a sub-set of the plurality of items shown in FIG. 1 on a larger scale.

Finally, by the time the display shown in FIG. 3 is reached, the files have all reached the correct position on the ground plane 10.

Of course, as the user zooms further in or zooms out, movement of the files to their new positions on the ground plane 10 can be animated.

Figure 7:
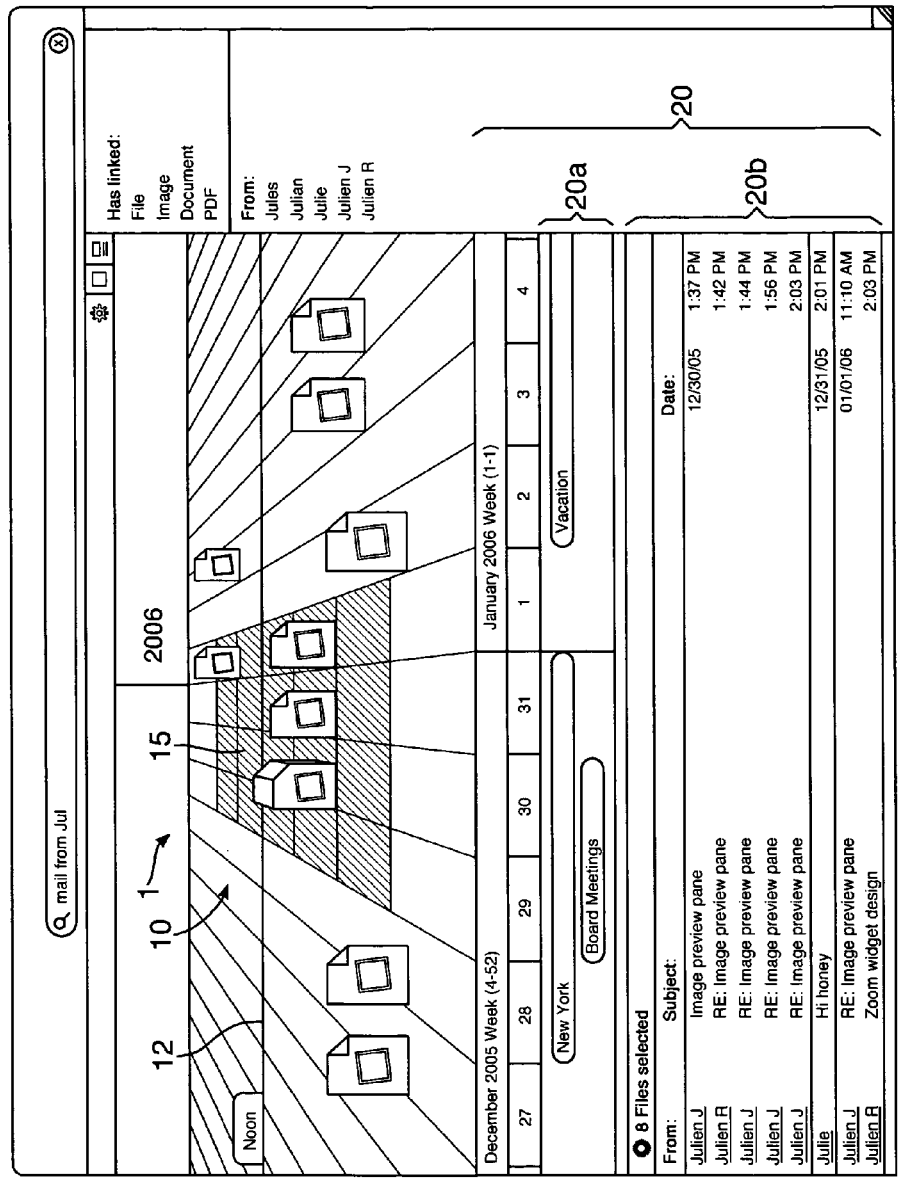
FIG. 7 is another display according to the present invention.

In the display shown in FIG. 7, the unit in the front pane of the display is days. A gradation 12 for noon is shown along the middle of the ground plane 10 in the x-direction, although this is optional. Similarly, gradations with a similar effect (such as halfway, quarter of the way etc along the ground plane in the z-direction) can be shown as the user zooms in or out.

Along with the divisions/units shown in the front pane 20, a calendar pane 20a is also shown. The user's events may be shown in a first colour and events from a shared calendar shown in a second colour at positions corresponding to correct divisions on the front pane 20. As an alternative, events from a calendar may be displayed as or instead of files on the ground pane. Events can be shown as items or as shading on the ground plane 10.

However, in the display shown in FIG. 7, a user has shaded in a portion 15 of the ground plane 10 in order to select a segment of time. Each of the files lying in the shaded portion 15 of the ground plane 10 is listed in a listing pane 20b of the front pane 20.

In the display in FIG. 7, the items are e-mails and this is indicated by the postmarked stamp shown on the front of the file. The listing pane 20b shows whom the message is from, the subject, the date and time of the message. A user can read the message by clicking it on the listing pane 20b or by clicking the file shown on the ground plane 10.

In addition, where it is not possible to see the front of a file shown on the ground plane 10, it may be possible for a user to "drill" through the files by moving a mouse arrow over them. In that case, as the arrow moves over the file, the file is lifted in the y-direction so that its front can be seen. Alternatively, as the arrow moves over the file, the files in front are temporarily removed.

As discussed above, the user may shade or highlight a portion of the ground plane 10 using, for example, a mouse control to select a segment of time. If desired, a control may be provided to enable the user to create a recurrence for the shaded portion, or for events or tasks within the shaded portion. In other applications, the recurrence would allow the user to see files created in consecutive segments of time. For example, if the January 2005 block were to be highlighted, then consecutive Januarys would be displayed on the ground plane 10.

The foregoing description has been given as an example of the present invention as applied to displaying files, such as document files or e-mails, in terms of a time associated with them. However, the present invention is not limited to displaying files—any other items can also be displayed. Moreover, the source of the items is not limited. Any items available to the user, whether of the same or different type, can be displayed. Thus, any one or more of document, picture, audio, video and other files may be displayed on the ground plane 10 at once. Moreover, these files may originate from a whole or any part of a folder hierarchy, and are displayed not in terms of the folder hierarchy but in terms of a time hierarchy instead.

Figure 8:
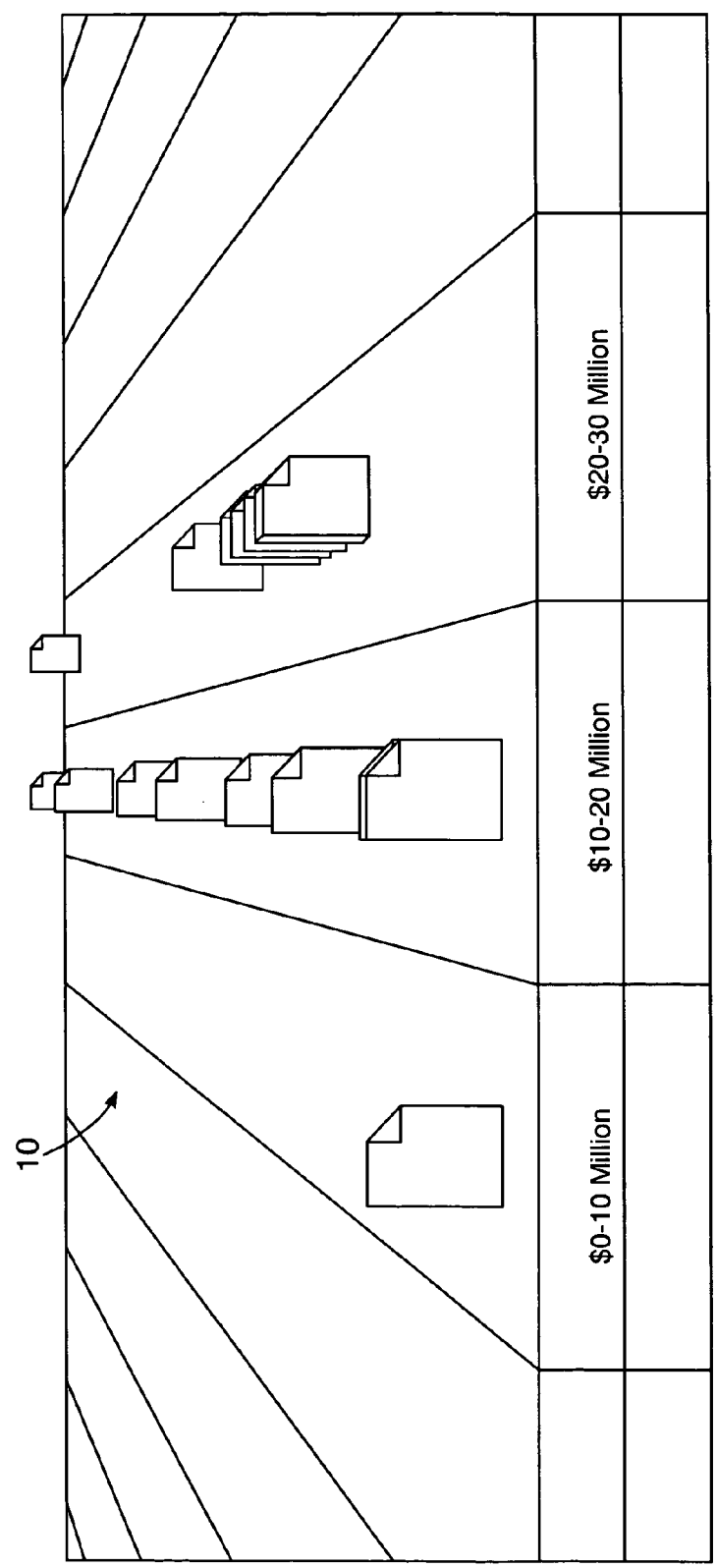
FIG. 8 is a display according to the invention of a plurality of items arranged into another hierarchy.

The present invention may also be applied to any other type of hierarchy other than time. For example, the items displayed might be trades performed by a trader in a financial trading house, as shown in FIG. 8. The divisions shown in a first view might be trades having a value from $0-10 million, $10-20 million, $20-30 million etc. As the user zooms in, the size of the divisions becomes decreases from $10 million to $1 million. Thus, if the user were to click on the $10-20 million division, he would be presented with divisions from £20-21 million, $21-22 million . . . $29-30 million. Similarly, as the user zooms out, the size of the divisions increases from $10 million to $100 million, for example. Again, trades are located in the appropriate column at positions corresponding to their size.

Figure 9:
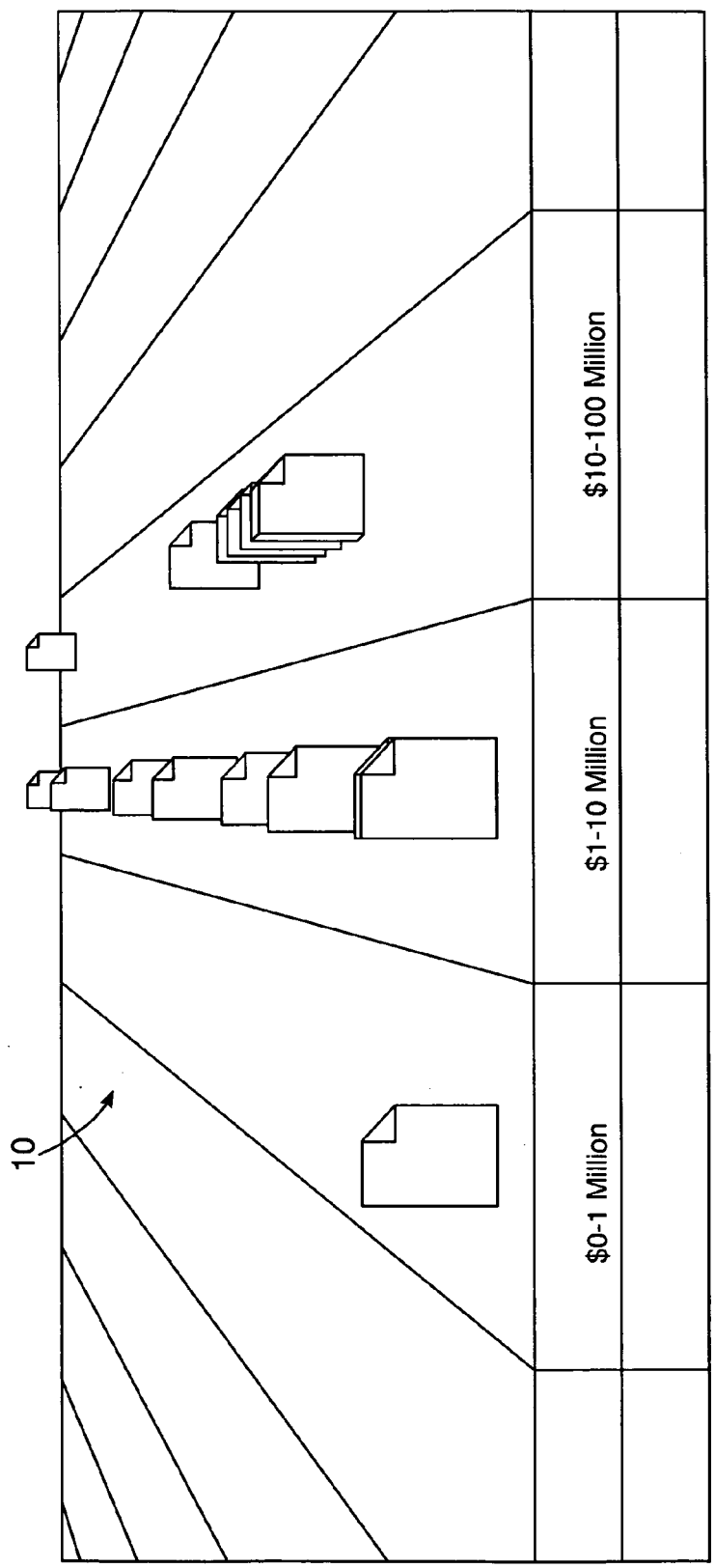
FIG. 9 is a display according to the invention of a plurality of items arranged into yet another hierarchy.

In this example, the scale of divisions is linear. However, this is not a requirement of the present invention. Thus, in the display shown in FIG. 9, the size of the divisions is not linear, divisions instead being from $0-1 million, $1-10 million, $10-100 million and so forth. The scales on zooming in/out may also be linear or non-linear. Various non-linear scales may be considered, such as logarithmic scales.

In the foregoing examples, each item is associated with a value that can be represented on a scale, such as time, size or monetary value. The sub-divisions on the front pane 20 are units of the scale. However, the present invention can also be used to display items ordered in different (that is, non-scaling) sort of hierarchy, such as a hierarchy having folders and sub-folders at different levels. In this case, the sub-divisions on the front pane 20 will be sub-folders.

Figure 10:
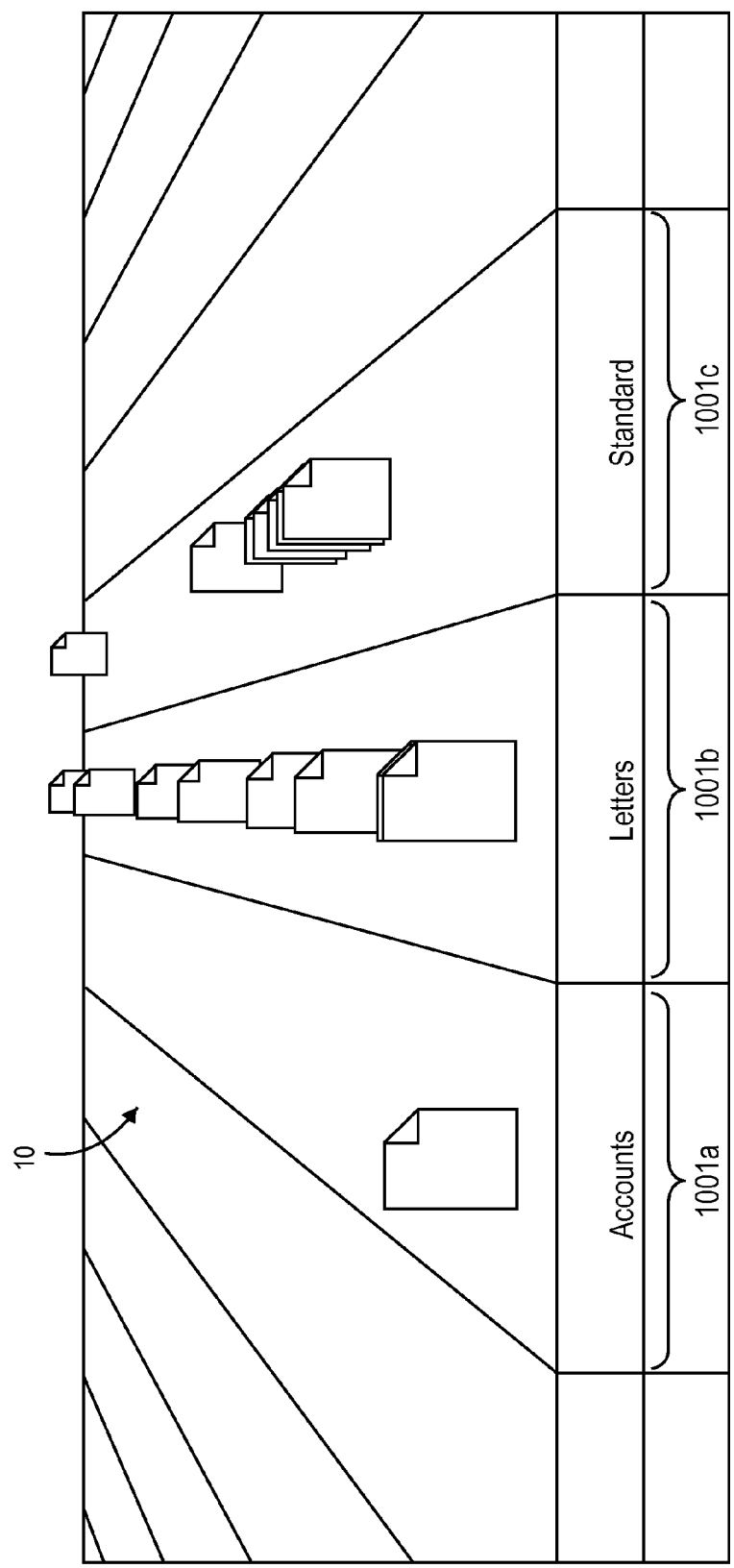
FIG. 10 is a display according to the invention of a plurality of items arranged into a folder hierarchy.

An example of such a display is shown in FIG. 10. In this example, a user has access to, or has selected, files in a top-level hierarchy containing folders labeled Accounts, Letters and Standard. All the document or other files in these directories are displayed on the ground plane 10, sorted into the appropriate columns 1001a-c. In this example, all files in the Letters folder are displayed in the Letters column, irrespective of whether they are actually contained in sub-folders that are ultimately included in the top level Letters folder, or are directly contained in the top-level folder—that is, at the same hierarchical level as a next level Letters sub-folder. This also applies to the Accounts and Standard folders.

However, it would also be possible to display only items showing sub-folders (but not their contents) or files directly contained in a particular folder (at the next sub-folder level).

Figure 11:
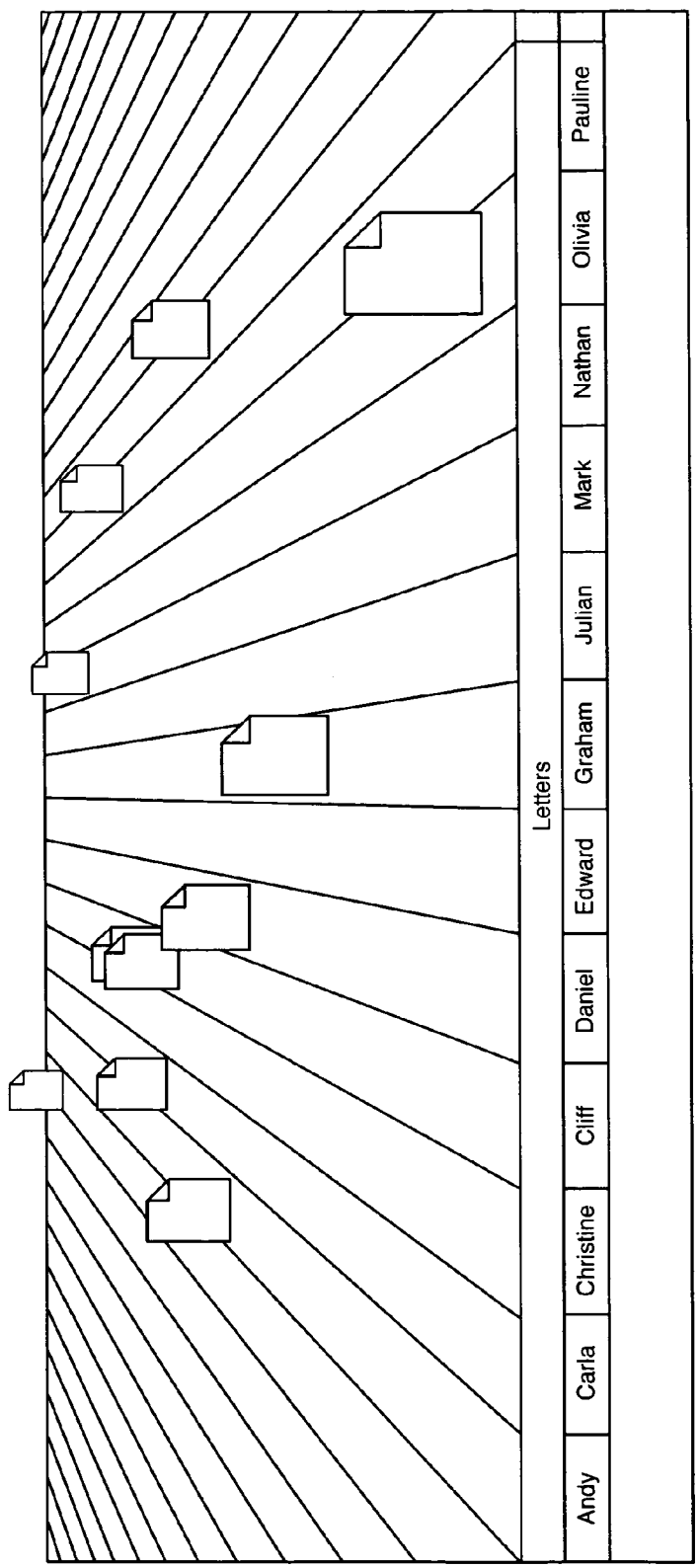
FIG. 11 is a display according to the invention of the items shown in FIG. 10 at another level of the hierarchy.

In FIG. 11, the user has clicked on the Letters sub-division in the front pane 20 shown in FIG. 10. Consequently, front pane now shows divisions for each of the sub-folders at the next level in the hierarchy, which have been given the names of addresses. Thus, the files in the Letters folder are now displayed in the appropriate column for the next hierarchical level.

Of course, a user may continue to drill down into lower levels of the hierarchy and can also drill out to higher levels of the hierarchy. In the present invention, this is effected by zooming in and out of the ground plane 10.

The ordering and spacing of the files in each column in FIGS. 10 and 11 is based on the time at which the documents were created. However, other ordering and spacing methods can be used—for example, the items can be regularly spaced apart and/or they can be ordered in terms of file size.

The depth of individual items in the z- or y-directions can be adjusted based on file size or other properties of the items.

In the foregoing examples, a visible ground plane 10 is displayed. However, the ground plane 10 need not be visible but may instead be imaginary.

In the foregoing examples, the items have generally been spaced along the columns corresponding to the value (time/monetary value etc) with which they are associated. However, this is not a requirement of the present invention. Rather, a fixed spacing between items in rows may be adopted. Other spacings also fall within the scope of the present invention.

In the foregoing description, items with the smallest value—for example, items created early—are positioned towards the back of the ground plane 10. However, this can be reversed, with small/early items being positioned towards the front and large/late items being positioned toward the back.

The foregoing description shows the viewpoint at the centre-front of the ground plane, with lines extending backward to a vanishing point. However, any appropriate viewpoint may be used and, preferably, the viewpoint may be selected by the user.

Figure 12:
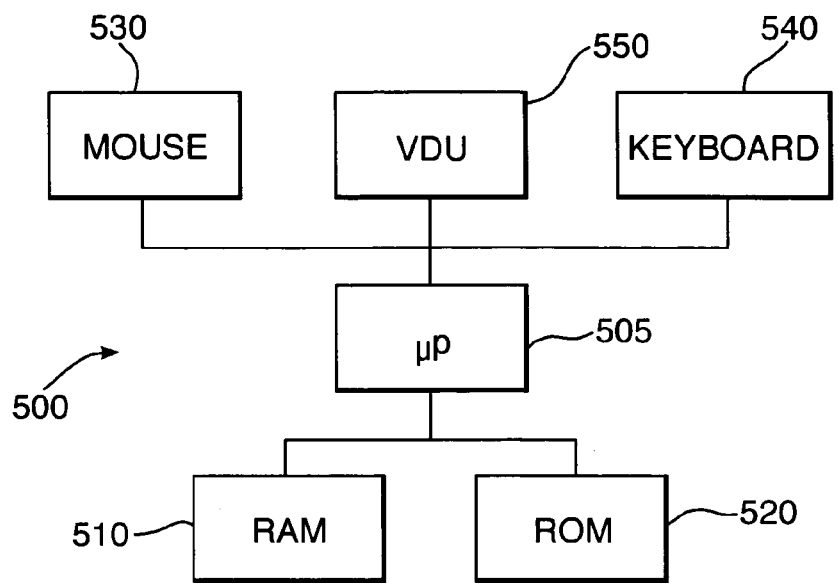
FIG. 12 is a schematic illustration of a computer system according to the present invention.

The present invention can be incorporated in and includes any device operating according to the above-described method. For example, FIG. 12 shows a simple computer 500 comprising a microprocessor 505, connected to a random access memory (RAM) 510, a read-only memory (ROM) 520, a mouse 530 and keyboard 540 as user input devices, and a visual display unit (VDU) 550 as an output unit. The ROM 520 has stored thereon an instruction set by which the microprocessor 505 is able to manipulate data and cause the VDU 550 to display it as described above, based on user input via the mouse 530 and the keyboard 540.

Figure 13:
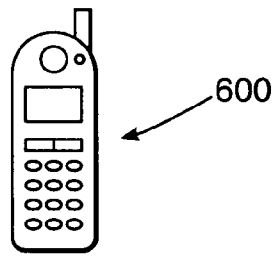
FIG. 13 is a schematic illustration of a cell phone according to the present invention.
Figure 14:
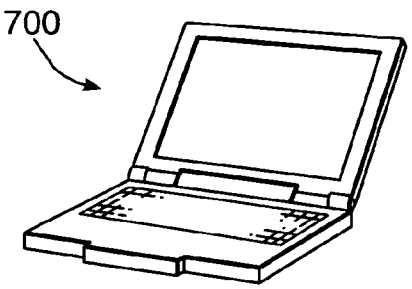
FIG. 14 is a schematic illustration of a laptop computer according to the present invention.

Similarly, the present invention is applicable to and includes, for example, an appropriately programmed cell phone 600, as shown in FIG. 13, and an appropriately programmed laptop computer 700, as shown in FIG. 14. The present invention also includes a computer program for causing a device to carry out the display methods described above, and a recording medium having such a program stored on it.

The foregoing description has been given by way of example only and it will be appreciated by a person skilled in the art that modifications can be made without departing from the spirit and scope of the present invention.

What is claimed is:

1. A computer-implemented method of displaying items arranged in a hierarchy, the hierarchy having predetermined levels and divisions, the method comprising:
    displaying a plurality of divisions of a first level of the hierarchy along a first direction on a ground pane in a first display area of a display, each division corresponding to a time scale unit;
    displaying one or more items in one or more of the divisions, wherein each item is displayed in a division based on a time attribute of the item in view of a relationship with a corresponding time scale unit;
    for each division, determining whether a number of items in the division exceeds a predetermined density threshold, wherein the predetermined density threshold is configurable by a user;
    aggregating and displaying at least two of the items into a single block in each division if the number of items of that division exceeds the predetermined density threshold;
    displaying the items on the ground pane in perspective view within the first display area, each item arranged at a position corresponding to the division with which it is associated in a respective second direction at an angle to the first direction; and
    in response to a selection of one or more divisions displayed on the ground pane in perspective view by highlighting the one or more divisions of the ground pane in order to select a segment of time, displaying one or more attributes of each of the items displayed within the highlighted one or more divisions on a listing pane in a second display area, the listing pane including a plurality of records each corresponding to one of the selected items, each record including displayed therein an author of the item, a brief description of the item, and time in which the item was created or last modified.

2. A method according to claim 1, wherein:
    each of the items has associated with it a value that can be represented on a scale;
    the divisions of the first level of the hierarchy are first units of the scale; and
    the items are arranged at positions corresponding to their value with respect to the first units.

3. A method according to claim 2, wherein the respective second directions represent a second level of the scale having second units that are smaller than the first units, and each item is arranged at a position in its respective second direction corresponding to its value with respect to the second units.

4. A method according to claim 3, wherein:
    the value is a time value; and
    the divisions of the first level of the scale are one of years, months, weeks, days or hours, respectively.

5. A method according to claim 3, comprising, on receipt of a user command:
    displaying divisions of the second level of the scale along the first direction; and
    displaying the items on the pane, each item arranged at a position corresponding to the division of the second level with which it is associated in the respective second direction at an angle to the first direction,
    wherein the respective second directions represent a third level of the scale having third units that are smaller than the second units, and each item is arranged at a position in its respective second direction corresponding to its value.

6. A method according to claim 5, further comprising an animation of movement of the items from display with the first units represented along the first direction and the second level along the respective second directions to display with the second units represented along the first direction and the third level represented along the respective second directions.

7. A method according to claim 2, wherein the scale is non-linear.

8. A method according to claim 1, comprising, on receipt of a user command:
    displaying divisions of a second level of the hierarchy along the first direction; and
    displaying the items on the plane, each item arranged at a position corresponding to the division of the second level with which it is associated in a respective second direction at an angle to the first direction.

9. A method according to claim 8, further comprising displaying an animation of movement of the items from display with the first level of the hierarchy represented along the first direction to display with the second level of the hierarchy represented along the first direction.

10. A method according to claim 1, wherein each of the items has associated with it a second value that can be represented on a scale; and the depth of each item in the respective second direction corresponds to the second value.

11. A method according to claim 1, wherein each of the items has associated with it a second value that can be represented on a scale; and the height of each item in a third direction orthogonal to the plane corresponds to the second value.

12. A method according to claim 1, wherein the respective second directions are different to one another.

13. A method according to claim 1, wherein the levels and the divisions are pre-defined by a user.

14. A method according to claim 1, wherein the hierarchy is a hierarchy of folders, with each division representing a different folder.

15. A method according to claim 14, wherein each of the items has associated with it a second value; and the depth of each item in the respective second direction corresponds to the second value.

16. A method according to claim 14, wherein each of the items has associated with it a second value; and the height of each item in a third direction orthogonal to the plane corresponds to the second value.

17. A non-transitory machine-readable storage medium having instructions stored therein, which when executed by a machine, cause the machine to perform a method of displaying a plurality of items, each item having a time associated with it, the method comprising:

> displaying a plurality of divisions of a first level of the hierarchy along a first direction on a ground pane in a first display area of a display, each division corresponding to a time scale unit;
>
> displaying one or more items in one or more of the divisions, wherein each item is displayed in a division based on a time attribute of the item in view of a relationship with a corresponding time scale unit;
>
> for each division, determining whether a number of items in the division exceeds a predetermined density threshold, wherein the predetermined density threshold is configurable by a user;
>
> aggregating and displaying at least two of the items into a single block in each division if the number of items of that division exceeds the predetermined density threshold;
>
> displaying the items on the ground pane in perspective view within the first display area, each item arranged at a position corresponding to the division with which it is associated in a respective second direction at an angle to the first direction; and
>
> in response to a selection of one or more divisions displayed on the ground pane in perspective view by highlighting the one or more divisions of the ground pane in order to select a segment of time, displaying one or more attributes of each of the items displayed within the highlighted one or more divisions on a listing pane in a second display area, the listing pane including a plurality of records each corresponding to one of the selected items, each record including displayed therein an author of the item, a brief description of the item, and time in which the item was created or last modified.

18. A medium according to claim 17, wherein each of the items has associated with it a value that can be represented on a scale; the divisions of the first level of the hierarchy are first units of the scale; and the items are arranged at positions corresponding to their value with respect to the first units.

19. A medium according to claim 18, wherein the respective second directions represent a second level of the scale having second units that are smaller than the first units, and each item is arranged at a position in its respective second direction corresponding to its value with respect to the second units.

20. A data processing system, comprising:

> a processor; and
>
> a memory coupled to the processor for storing instructions, which when executed from the memory, cause the processor to perform operations, including
>
>> displaying a plurality of divisions of a first level of the hierarchy along a first direction on a ground pane in a first display area of a display, each division corresponding to a time scale unit,
>>
>> displaying one or more items in one or more of the divisions, wherein each item is displayed in a division based on a time attribute of the item in view of a relationship with a corresponding time scale unit,
>>
>> for each division, determining whether a number of items in the division exceeds a predetermined density threshold, wherein the predetermined density threshold is configurable by a user,
>>
>> aggregating and displaying at least two of the items into a single block in each division if the number of items of that division exceeds the predetermined density threshold,
>>
>> displaying the items on the ground pane in perspective view within the first display area, each item arranged at a position corresponding to the division with which it is associated in a respective second direction at an angle to the first direction, and
>>
>> in response to a selection of one or more divisions displayed on the ground pane in perspective view by highlighting the one or more divisions of the ground pane in order to select a segment of time, displaying one or more attributes of each of the items displayed within the highlighted one or more divisions on a listing pane in a second display area, the listing pane including a plurality of records each corresponding to one of the selected items, each record including displayed therein an author of the item, a brief description of the item, and time in which the item was created or last modified.

21. An apparatus comprising a non-transitory computer-readable storage medium, the apparatus further comprising:

> means for displaying a plurality of divisions of a first level of the hierarchy along a first direction on a ground pane in a first display area of a display, each division corresponding to a time scale unit;
>
> means for displaying one or more items in one or more of the divisions, wherein each item is displayed in a division based on a time attribute of the item in view of a relationship with a corresponding time scale unit;
>
> for each division, means for determining whether a number of items in the division exceeds a predetermined density threshold, wherein the predetermined density threshold is configurable by a user;
>
> means for aggregating and displaying at least two of the items into a single block in each division if the number of items of that division exceeds the predetermined density threshold;
>
> means for displaying the items on the ground pane in perspective view within the first display area, each item arranged at a position corresponding to the division with which it is associated in a respective second direction at an angle to the first direction;
>
> in response to a selection of one or more divisions displayed on the ground pane in perspective view by highlighting the one or more divisions of the ground pane in order to select a segment of time, means for displaying one or more attributes of each of the items displayed within the highlighted one or more divisions on a listing pane in a second display area, the listing pane including a plurality of records each corresponding to one of the selected items, each record including displayed therein an author of the item, a brief description of the item, and time in which the item was created or last modified.

\* \* \* \* \*